S. TAKACS.
SCREW DRIVER.
APPLICATION FILED AUG. 3, 1914.

1,139,083.

Patented May 11, 1915.

Witnesses

Inventor
STEVE TAKACS.

By
Attorney

UNITED STATES PATENT OFFICE.

STEVE TAKACS, OF NEWARK, OHIO.

SCREW-DRIVER.

1,139,083.     Specification of Letters Patent.     Patented May 11, 1915.

Application filed August 3, 1914. Serial No. 854,602.

*To all whom it may concern:*

Be it known that I, STEVE TAKACS, a subject of Hungary, residing at Newark, in the county of Licking and State of Ohio, have invented certain new and useful Improvements in Screw-Drivers, of which the following is a specification.

My invention relates to screw drivers and aims particularly to provide a structure of screw driver wherein the screw to be driven may be removably attached to the chisel-shaped end thereof. It frequently happens that it becomes necessary to place a screw where it is extremely difficult to hold it with one hand and use the screw driver with the other. To this end, my invention may be used to apply the screw with comparative ease.

The main object of my invention resides in the provision of a pair of gripping jaws so arranged that they may be moved to a position adjacent the chisel-shaped end of the body and also may be moved toward each other into gripping engagement with a screw head.

Another object of my invention resides in providing one structure for moving the jaws toward or away from the chisel-shaped end and a supplemental structure for moving the jaws toward each other. In this manner the screw driver may be adapted for use in connection with screws having heads varying in size to a considerable extent.

Figure 1:
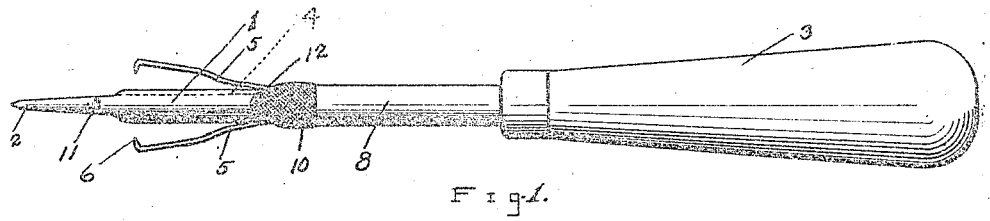
Figure 2:
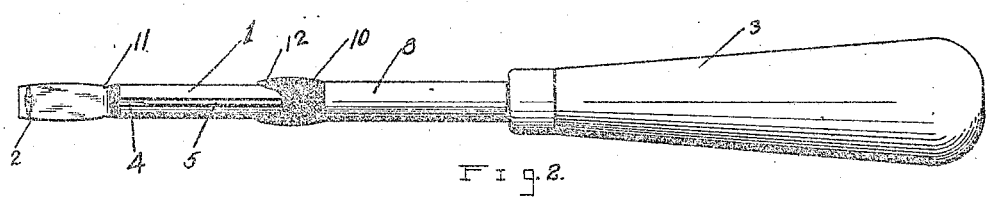
Figure 3:
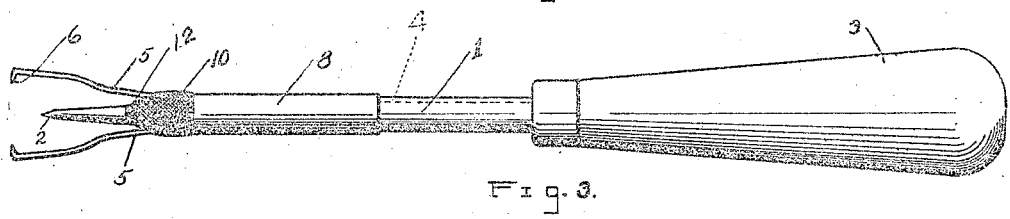
Figure 4:
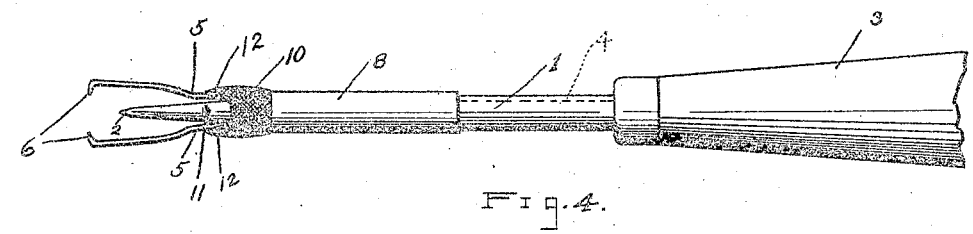
Figure 5:
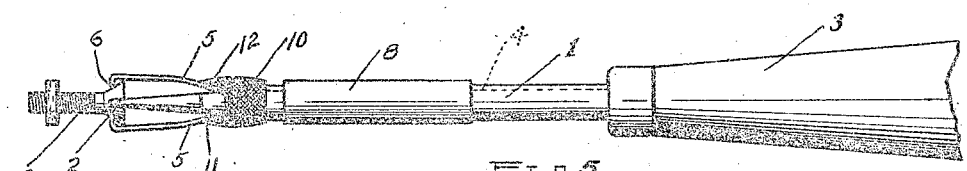
Figure 6:
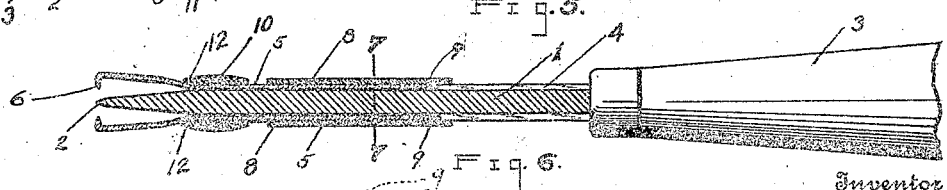
Figure 7:
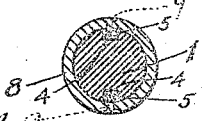

My invention also resides in the combination of parts as may hereinafter be apparent and after a detailed description of the accompanying sheet of drawings, in which similar characters of reference designate corresponding parts, and in which:

Figure 1 is a side view of my improved type of screw driver showing the jaws in their rearmost position, Fig. 2 is a view of the structure shown in Fig. 1 and taken at right angles thereto, Fig. 3 is a view similar to Fig. 1, but showing the jaws moved to their outermost position, Fig. 4 is a view similar to Fig. 3, but showing these jaws moved toward each other, Fig. 5 is a view similar to Fig. 1, showing the jaws in gripping engagement with a screw head, Fig. 6 is a central vertical section of the structure shown in Fig. 5 with the screw removed, and, Fig. 7 is a cross section taken on line 7—7 of Fig. 6.

My invention is adapted for use in connection with screw drivers of the ordinary type wherein 1 designates the main body member, this member being provided with a chisel-shaped end as is shown at 2 and the entire member itself mounted within any form of handle element 3. The body portion 1 is shown as being longitudinally grooved at 4 at points diametrically opposite each other and within these slots are arranged the shanks of jaws 5, these jaws having their outer ends bent inwardly as is shown at 6. In order to move these jaws longitudinally of the body member, I have provided an enveloping sleeve member 8 to which the inner ends of the shanks of the jaws 5 are rigidly attached as by rivets shown at 9. In this manner, movement longitudinally of the body 1 of the sleeve 8 causes a corresponding movement of the jaws themselves sliding within the grooves 4. In order that the jaws 5 may be forced toward each other, I have provided a second sleeve member 10, this sleeve member being also slidable on the body 1 and being mounted thereon between the chisel shaped end and the sleeve 8. Movement of the second sleeve member 10 toward the end 2, is limited by the shoulders 11, these shoulders being primarily for the purpose of preventing accidental removal of these sleeve members. In order that the jaws may be further moved toward each other, I have provided the end of the second sleeve member 10 nearest the chisel-shaped end of the body 1 with cam formations as is indicated at 12 from which it will be apparent that a rotative movement thereof will attain the result desired. It will thus be apparent that I have provided a type of screw driver which may be used as a means of access to very obstructed places. Further, this screw driver may be used in the ordinary manner and not interfere with its operation by simply moving the parts to their release position as is shown in Fig. 1.

The manner of using my device is as follows: A screw of any preferred type such, for instance, as is shown at 13 is provided. This screw then has its slotted head placed in position with the chisel-shaped end 2 and the sleeve 1 moved forward to the position shown in Fig. 3. This forward movement also causes forward movement of the second sleeve member 10 and by a rotative movement thereof, the jaws may be brought into the desired gripping engagement with the screw head. It will also be readily apparent that a simple forward movement of the second sleeve member, as shown in Fig. 3, may also cause a movement of the jaw ends toward each other if desired.

What I claim, is:

1. A screw driver comprising a body member, a pair of jaws movable toward and away from the chisel-shaped end of said body, a sleeve movable longitudinally on said body, and cam formations carried by the end of said sleeve nearest the chisel-shaped end of said body and arranged to engage said jaws by rotative movement of said sleeve to move said jaws toward each other into gripping engagement with a screw head.

2. A screw driver comprising a body member, a pair of jaws movable toward and away from the chisel shaped end of said body, a sleeve slidable longitudinally on said body and arranged to embrace said jaws, and cam formations carried by the end of said sleeve nearest the chisel shaped end of said body and formed by cutting out portions of said sleeve between its ends at diametrically opposite points, thereby leaving projecting prongs, said formations being arranged to engage said jaws by rotative movement of said sleeve to move said jaws toward each other into gripping engagement with a screw head.

In testimony whereof I affix my signature in presence of two witnesses.

STEVE TAKACS.

Witnesses:
 HOWARD JONES,
 ANDREW PERETZKY.